United States Patent
Fukuda et al.

(10) Patent No.: US 9,929,612 B2
(45) Date of Patent: Mar. 27, 2018

(54) STATOR FOR ROTATING ELECTRIC MACHINE

(71) Applicant: Hitachi Automotive Systems, Ltd., Hitachinaka-shi, Ibaraki (JP)

(72) Inventors: Tomohiro Fukuda, Hitachinaka (JP); Takahiro Ohmori, Hitachinaka (JP); Takashi Genmoto, Hitachinaka (JP); Kenichi Nakayama, Hitachinaka (JP); Hisaya Shimizu, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 205 days.

(21) Appl. No.: 14/437,216

(22) PCT Filed: Oct. 7, 2013

(86) PCT No.: PCT/JP2013/077196
§ 371 (c)(1),
(2) Date: Apr. 21, 2015

(87) PCT Pub. No.: WO2014/065103
PCT Pub. Date: May 1, 2014

(65) Prior Publication Data
US 2015/0303754 A1    Oct. 22, 2015

(30) Foreign Application Priority Data

Oct. 26, 2012   (JP) .................................. 2012-236194

(51) Int. Cl.
*H02K 3/12* (2006.01)
*H02K 3/50* (2006.01)
(Continued)

(52) U.S. Cl.
CPC ................ *H02K 3/12* (2013.01); *H02K 3/48* (2013.01); *H02K 3/50* (2013.01); *H02K 3/04* (2013.01);
(Continued)

(58) Field of Classification Search
CPC ............... H02K 3/50; H02K 3/48; H02K 3/12
(Continued)

(56) References Cited

U.S. PATENT DOCUMENTS

2003/0067241 A1* 4/2003 Takao ...................... H02K 1/16
                                                            310/214
2003/0218394 A1* 11/2003 Hashiba ................... H02K 3/12
                                                            310/71
(Continued)

FOREIGN PATENT DOCUMENTS

EP      2 273 654 A2      1/2011
JP      2003-348780 A    12/2003
(Continued)

OTHER PUBLICATIONS

Extended European Search Report issued in counterpart European Application No. 13848545.3 dated Jun. 7, 2016 (seven (7) pages).
(Continued)

*Primary Examiner* — Naishadh Desai
(74) *Attorney, Agent, or Firm* — Crowell & Moring LLP (57) ABSTRACT

A new rotor for a rotating electric machine assuring outstanding durability and reliability against vibration and facilitating equalization of resistances among a plurality of rotor coils, while allowing the leading ends of a plurality of lead wires to be disposed so as to congregate in one area, is provided. A plurality of stator coils 102 wound at a cylindrical stator core 101 each include leader portions led out from one of two ends of a slot along the axial direction and extending astride a plurality of slots. Lead wires 300 each
(Continued)

formed at one end of a stator coil 102 are disposed so that their leading ends, oriented in the same direction, congregate in a single area. In a leader portion where a lead wire 300 is located, a turnback portion 400, made to turn back with an angle equal to or greater than 90° from an inclining wire portion 113, which is led out with an inclination along a predetermined direction from the slot, is formed.

9 Claims, 11 Drawing Sheets (51) Int. Cl.
 *H02K 3/48* (2006.01)
 *H02K 3/04* (2006.01)
 *H02K 15/00* (2006.01)
(52) U.S. Cl.
 CPC ..... *H02K 15/0025* (2013.01); *H02K 15/0056* (2013.01); *H02K 2213/03* (2013.01)
(58) Field of Classification Search
 USPC ........................................ 310/179, 180, 184
 See application file for complete search history.

(56) References Cited

U.S. PATENT DOCUMENTS

| | | |
|---|---|---|
| 2004/0232780 A1 | 11/2004 | Oohashi |
| 2010/0026113 A1* | 2/2010 | Nakamura ......... H02K 15/0037 310/64 |
| 2011/0012472 A1* | 1/2011 | Umeda .................... H02K 3/28 310/207 |
| 2011/0133593 A1* | 6/2011 | Nakamura ............... H02K 3/12 310/201 |
| 2011/0175483 A1* | 7/2011 | Koike ...................... H02K 3/12 310/201 |
| 2012/0019081 A1* | 1/2012 | Tamura .................... H02K 3/12 310/43 |
| 2012/0146447 A1* | 6/2012 | Seguchi ................... H02K 3/12 310/198 |
| 2013/0169102 A1* | 7/2013 | Fukushige ............... H02K 3/12 310/198 |
| 2014/0062230 A1 | 3/2014 | Mori et al. |

FOREIGN PATENT DOCUMENTS

| | | |
|---|---|---|
| JP | 2004-350381 A | 12/2004 |
| JP | 2010-35366 A | 2/2010 |
| WO | WO 2012/137862 A1 | 10/2012 |
| WO | WO 2012137862 A1 * | 10/2012 ............... H02K 3/12 |

OTHER PUBLICATIONS

International Search Report (PCT/ISA/210) dated Jan. 21, 2014 with English-language translation (Two (2) pages).

\* cited by examiner

STATOR FOR ROTATING ELECTRIC MACHINE

TECHNICAL FIELD

The present invention relates to a stator for a rotating electric machine and, more specifically, it relates to an improvement made in a lead wire of a stator coil, via which a connection with an external device is achieved.

BACKGROUND ART

Patent literature 1 describes an example of a stator for a rotating electric machine in the related art. In this stator, a lead wire located at an end of one of a plurality of stator coils wound at the stator core and connects with an external device, taken out from the conductor at the innermost position along the radial direction, among the plurality of conductors in the stator coils disposed in a slot at the stator core. In addition, a vibration-absorbing bent portion is formed at the lead wire so as to absorb tensile and compressive forces that would otherwise act on the lead wire.

CITATION LIST

Patent Literature

Patent Literature 1: Japanese Laid-Open Patent Application No. 2004-350381

SUMMARY OF INVENTION

Technical Problem

It is desirable to set the leading ends of lead wires, used to achieve external connection, in a stator installed in a motor (rotating electric machine) in, for instance, an electric vehicle at a single position so as to facilitate connections with cables. In addition, it is desirable that the salient region where the lead wires are disposed above the coil ends at one end of the stator along the axial direction be formed as narrow as possible in order to assure sufficient clearance from another device such as a transmission unit. However, such a concentration of lead wires in a single area is bound to give rise to excessive tensile force or compressive stress due to relative positional shift between the stator and the lead wires for external connection, caused by vibration of the engine and the rotating electric machine, and thus necessitates structural measures that assure reliability and durability of the lead wires.

An object of the present invention is to provide a new stator for a rotating electric machine that includes a plurality of lead wires with the leading ends thereof set so as to congregate in a single area, assures outstanding durability and reliability against vibration and makes it possible to equalize the wire resistances among the plurality of stator coils with better ease.

Solution to Problem

A stator for a rotating electric machine according to the present invention, comprises: a stator core having a cylindrical shape; and a plurality of stator coils wound at the stator core, wherein: a plurality of slots passing through the stator core along an axial direction and set side-by-side along a circumferential direction are formed at the stator core; the stator coils each extend within the slots along the axial direction and also include leader portions each led out from one of the two ends of the slot along the axial direction and extending along the circumferential direction so as to run astride a plurality of slots, set apart from one another with a predetermined circumferential pitch; the leader portions each include an inclining wire portion led out from one of the two ends of the slot along the axial direction with an inclination along a predetermined direction relative to the axial direction; a lead wire via which a connection with an external device is achieved is formed at one end of each stator coil, and lead wires each belonging to one of the plurality of stator coils are all positioned so as to congregate in one area with leading ends thereof oriented in one direction; and the lead wires each include a turnback portion formed to turn back from the inclining wire portion with an angle equal to or greater than 90°.

Advantageous Effects of Invention

According to the present invention, outstanding durability and reliability against vibration are assured and uniformity in the wire resistance among the plurality of rotor coils is achieved with ease in conjunction with a plurality of lead wires disposed so that their leading ends are made to congregate in a single area.

DESCRIPTION OF EMBODIMENTS

The following is a description of an embodiment of the present invention. Essential components configuring a rotating electric machine are a cylindrical stator and a rotor disposed on the inner circumferential-side of the stator over a predetermined gap. The stator includes a cylindrical stator core having a plurality of magnetic poles set so as to achieve alternating polarities along the rotating direction, and a plurality of stator coils wound at the stator core. On the stator core, a plurality of slots are formed so as to pass through the stator core along the axial direction and to dispose successively along the circumferential direction. The stator coils are each formed by electrically connecting numerous conductors housed inside the individual slots. A stator coil extends through the slots along the axial direction and also includes leader portions each led out from one of the two ends of a slot along the axial direction and extending astride a plurality of slots set apart from one another with a predetermined pitch along the circumferential direction in correspondence to a plurality of magnetic poles. The leader portions each include an inclining wire portion led out from one end of a slot, located on one side along the axial direction, with an inclination in a predetermined direction relative to the axial direction.

At the both ends of each of the stator coil, a lead wire for external connection and a neutral wire portion are formed, and stator coils corresponding to a plurality of phases are connected at their neutral wire portions through, for instance, a Y-connection.

In the present embodiment, all the lead wires belonging to the plurality of stator coils are set so as to congregate in one area with their leading ends oriented in the same direction. For instance, the plurality of lead wires may each be located at the leader portion of the conductor taking up the outermost position along the radial direction among the plurality of conductors disposed in a slot and such lead wires may be disposed in a neat alignment substantially along the radial direction at an outer circumferential area of the stator core.

Each lead wire portion includes a turnback portion that is made to turn back from the inclining wire portion with an angle equal to or greater than 90°. The presence of such turnback portions, made to turn back with an angle equal to or greater than 90° from the inclining wire portions at the individual lead wires, makes it possible to suppress vibration by improving the rigidity of the plurality of lead wire portions, while the leading ends of the lead wires are set to congregate in a single area. In addition, by forming an appropriate bent portion at each lead wire portion so as to adjust its length optimally, uniformity in the wire resistance among the plurality of rotor coils can be achieved with ease in conjunction with the positional arrangement whereby the leading ends of the plurality of lead wires are set to congregate in a single area, and furthermore, by minimizing the width of the salient region, i.e., the space where the lead wires are disposed, sufficient clearance from another device such as a transmission unit is assured.

Embodiment 1

Figure 1:
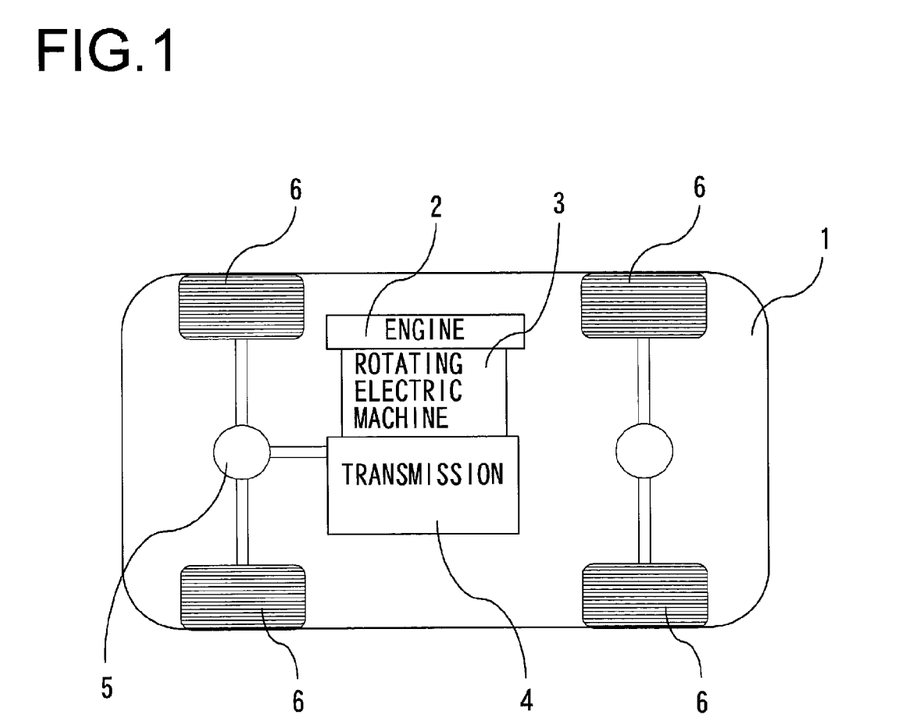
FIG. 1 A block diagram of a hybrid electric vehicle equipped with a stator for a rotating electric machine achieved in embodiment 1 of the present invention FIG. 2 A partial sectional view of the rotating electric machine FIG. 3 A perspective view of the stator in the rotating electric machine FIG. 4 A sectional correspondence diagram indicating stator coil conductors inserted in various slots in the stator core of the stator FIG. 5 A side elevation correspondence diagram indicating lead wires of the stator coils FIG. 6 A perspective view showing the lead wires of the stator coils FIG. 7 A top view indicating the position at which the lead wires are disposed FIG. 8 A perspective view of a U-phase lead wire FIG. 9 An illustration of a coil forming process through which a lead wire is formed FIGS. 10A and 10B Another illustration of the coil forming process through which a lead wire is formed FIG. 11 An illustration of a stator coil in a stator for a rotating electric machine achieved in embodiment 2 of the present invention

In reference to FIGS. 1 through 10, embodiment 1 of the present invention will be described. FIG. 1 is a block diagram of a hybrid electric vehicle having installed therein the rotating electric machine achieved in embodiment 1 of the present invention. An engine 2 and a rotating electric machine 3, each used for vehicle power source are installed in a vehicle 1. It is to be noted that two rotating electric machines assigned with different roles may be used in combination, and in such a case, one of the rotating electric machines will be engaged in both power generation and vehicle drive, whereas the other rotating electric machine will be used to drive the vehicle.

Rotational torque generated via the engine 2 and the rotating electric machine 3 is transmitted to wheels (drive wheels) 6 via a transmission 4, which may be a continuously variable transmission or a stepped automatic transmission, and a differential gear unit 5. The rotating electric machine 3 is installed between the engine 2 and the transmission 4 or inside the transmission 4. This means that the rotating electric machine 3 must be provided as a high-output, compact unit, so as to assure the best possible efficiency in utilization of available space in the vehicle 1.

Figure 2:
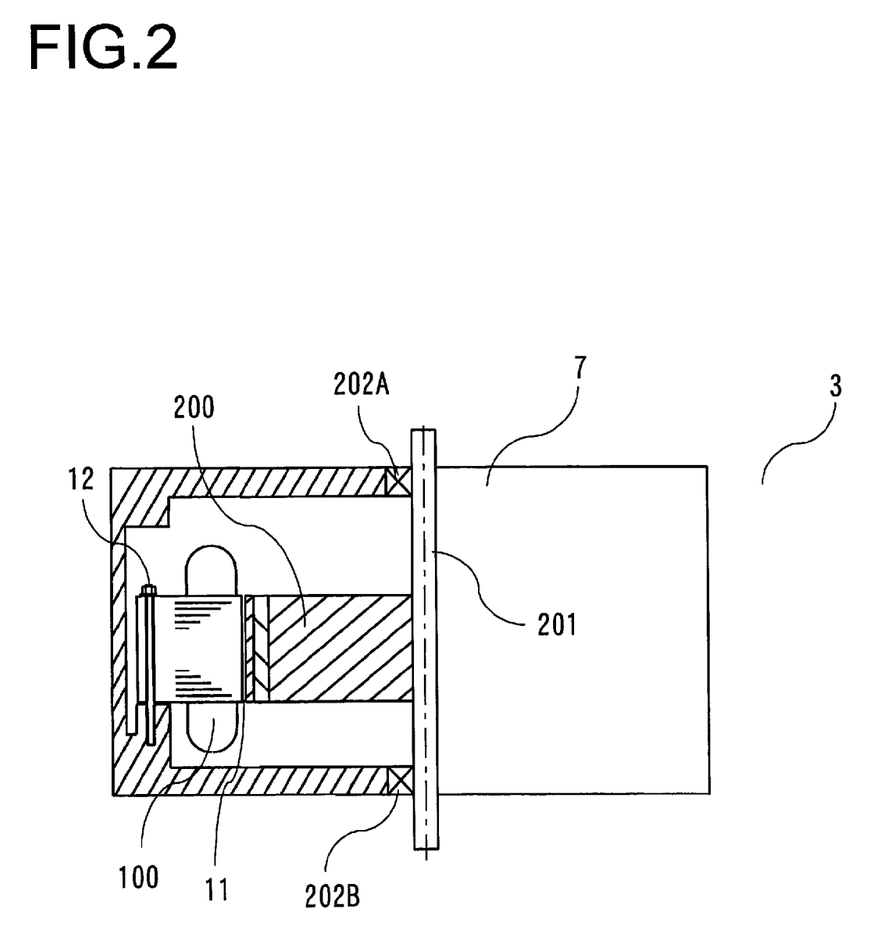

FIG. 2 schematically illustrates the rotating electric machine 3 in a partial sectional view, with the area thereof located to the right of a shaft 201 shown in a sectional view and the area thereof to the left of the shaft 201 shown in a side elevation. The rotating electric machine 3 is housed inside a case 7. In a configuration such as that shown in FIG. 1, in which the rotating electric machine 3 is disposed between the engine 2 and the transmission 4, a case housing the engine 2 or a case housing the transmission 4 is also utilized as the case 7. If, on the other hand, the rotating electric machine 3 is installed in the transmission 4, the case housing the transmission 4 is also used as the case 7.

As is widely known, the rotating electric machine 3 comprises a stator 100 and a rotor 200. The rotor 200 is disposed on the inner circumferential side of the stator 100 via a gap 11. The rotor 200 is fixed to the shaft 201 and thus rotates as one with the shaft 201. The shaft 201 is rotatably supported at the case 7 at the two ends thereof via bearings 202A and 202B. The outer circumferential side of the stator 100 is fixed to the inner circumferential side of the case 7 with bolts 12 or the like. The rotating electric machine 3 is a three-phase synchronous motor having permanent magnets installed in the rotor 200, and as a large three-phase current (e.g., approximately 300 A) is provided to the stator, the rotating electric machine 3 is engaged in operation as a motor. In addition, the rotating electric machine 3 achieved in the present embodiment is a flat rotating electric machine with the thickness thereof, measured along the rotating shaft, smaller than the outer diameter (measured along the radial direction).

Figure 3:
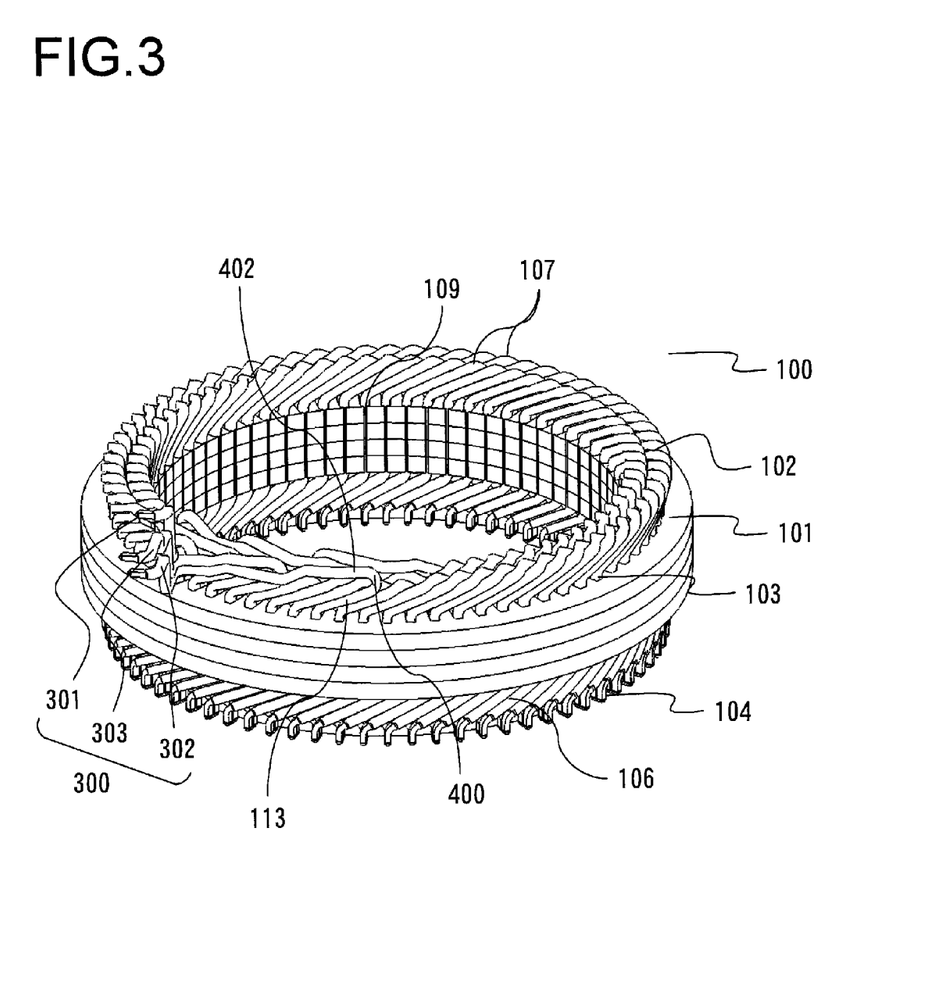
Figure 4:
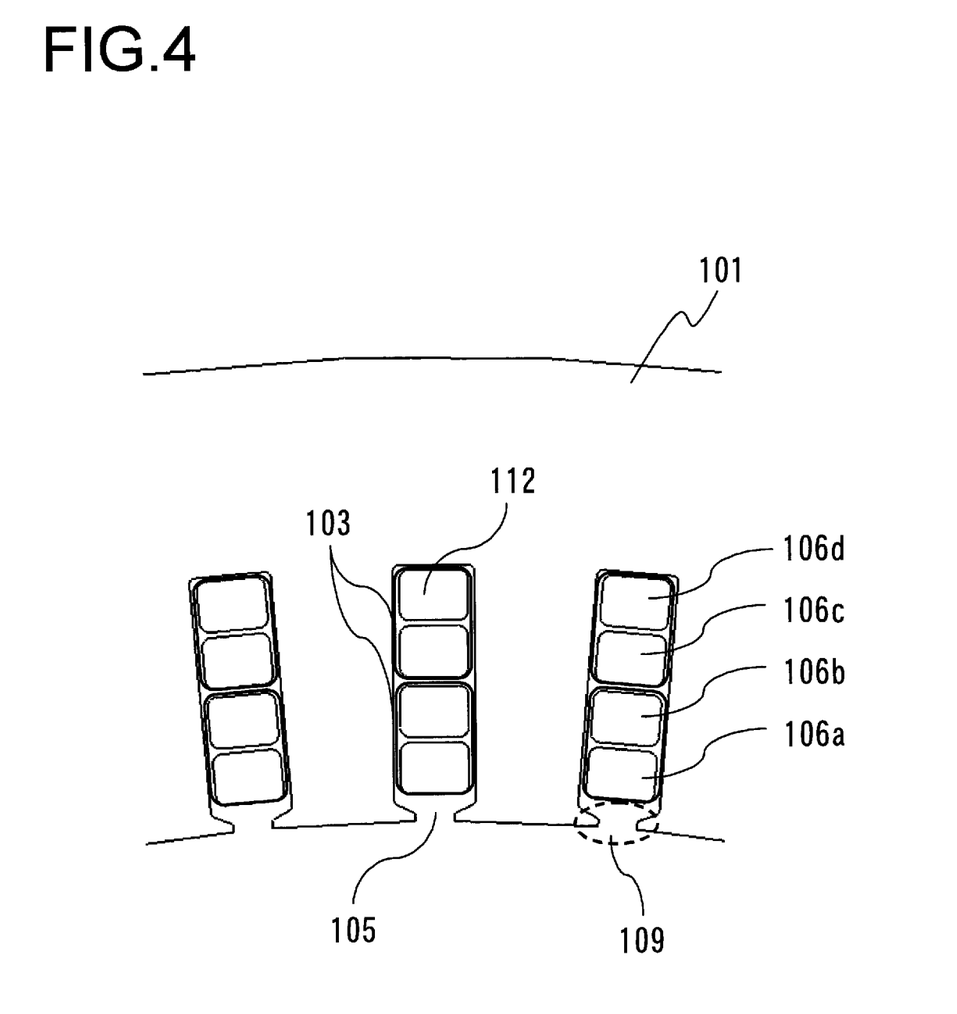

FIG. 3 shows the stator 100 of the rotating electric machine 1 by itself in a perspective view, and FIG. 4 shows the inside of various slots 105 in a sectional correspondence diagram. It is to be noted that the basic structure of the stator 100, disclosed in Japanese Laid Open Patent Application No. 2011-15459 previously submitted by the applicant of the present invention, is already known and accordingly, only a brief explanation thereof will be provided in this document.

As FIG. 3 and FIG. 4 show, the stator 100 comprises a stator core (a stator iron core) 101 with a plurality of slots 105 formed on the inner circumferential side thereof and three stator coils 102 corresponding to a V-phase, a U-phase and a W-phase, which are wound at the stator core 101. The slots 105, formed so as to pass through the stator core along the axial direction, are set over equal intervals along the circumferential direction with a predetermined circumferential pitch, and slits 109 with openings thereof ranging along the axial direction are formed on the inner circumferential side.

The stator coils 102 each include numerous conductors 106 that are inserted and held in slots 105, as will be described later. With the conductors 106 disposed next to one another inside each slot 109 welded together at their welding areas 104 located at one of the two ends of the stator core 101 along the axial direction (at the lower end in FIG. 3), a long stator coil 102 is formed with a plurality of conductors 106 electrically connected at the welding areas 104. An insulating sheet 103 is inserted in each slot 105 and by the insulating sheet 103, linear portions 112 of the conductors 106 passing through the slots 105 are electrically insulated from the stator core 101. As FIG. 4 indicates, an insulating sheet 103 is disposed so as to bundle two successive conductors 106 among four conductors 106 disposed inside each slot 105. Namely, two insulating sheets 103 are disposed in each slot 105.

The stator coils 102 include leader portions 107 each led out from one of the two ends of a slot 105 along the axial direction and forming a substantially U or V shape. Each leader portion 107 extends astride a plurality of slots 105 set apart from one another with a predetermined circumferential pitch. With a plurality of such stator coils 102, a plurality of magnetic poles set so as to achieve alternating polarities along the rotating direction are formed.

Figure 5:
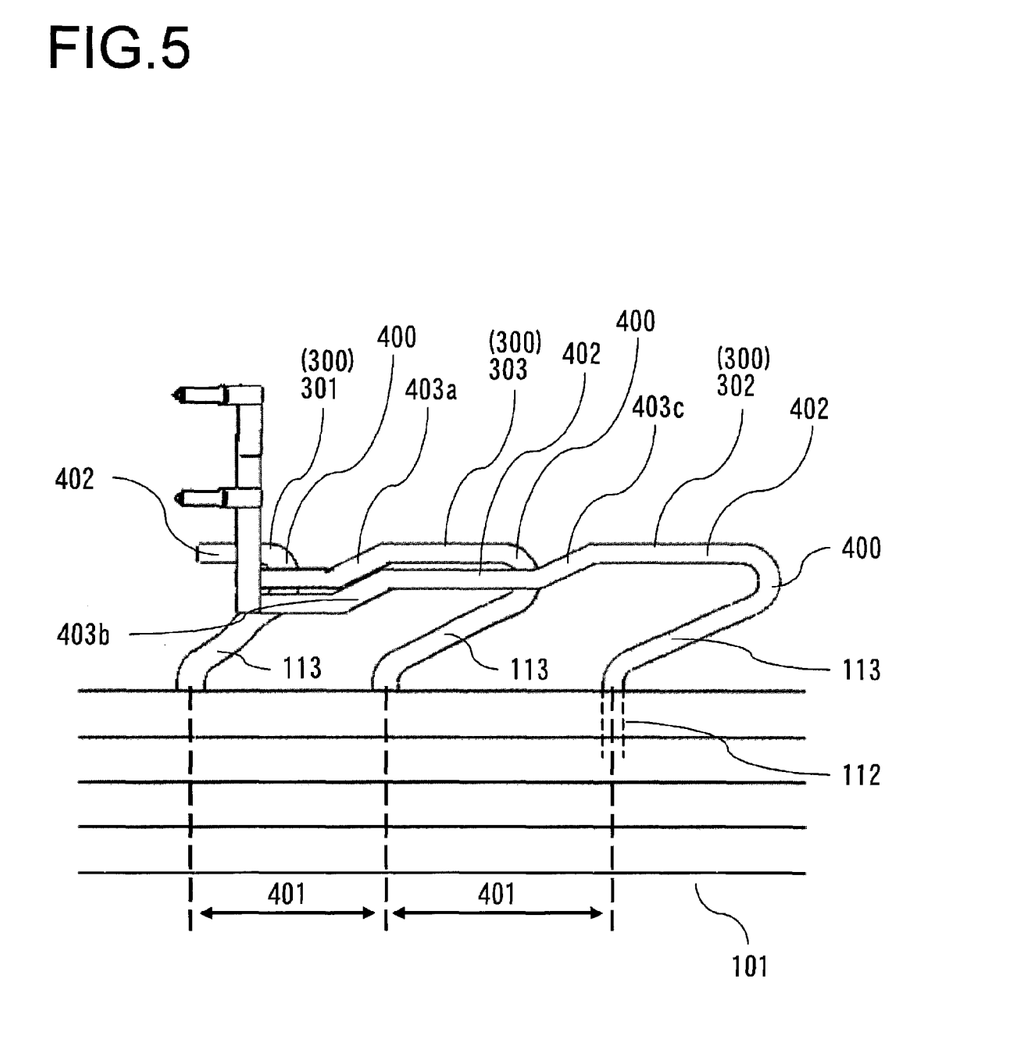
Figure 6:
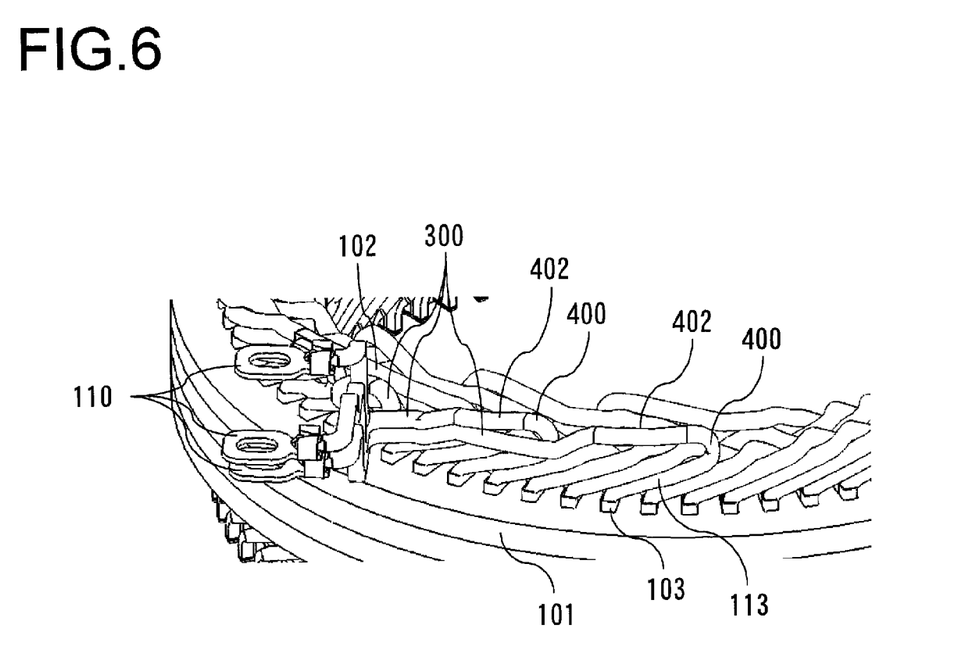
Figure 7:
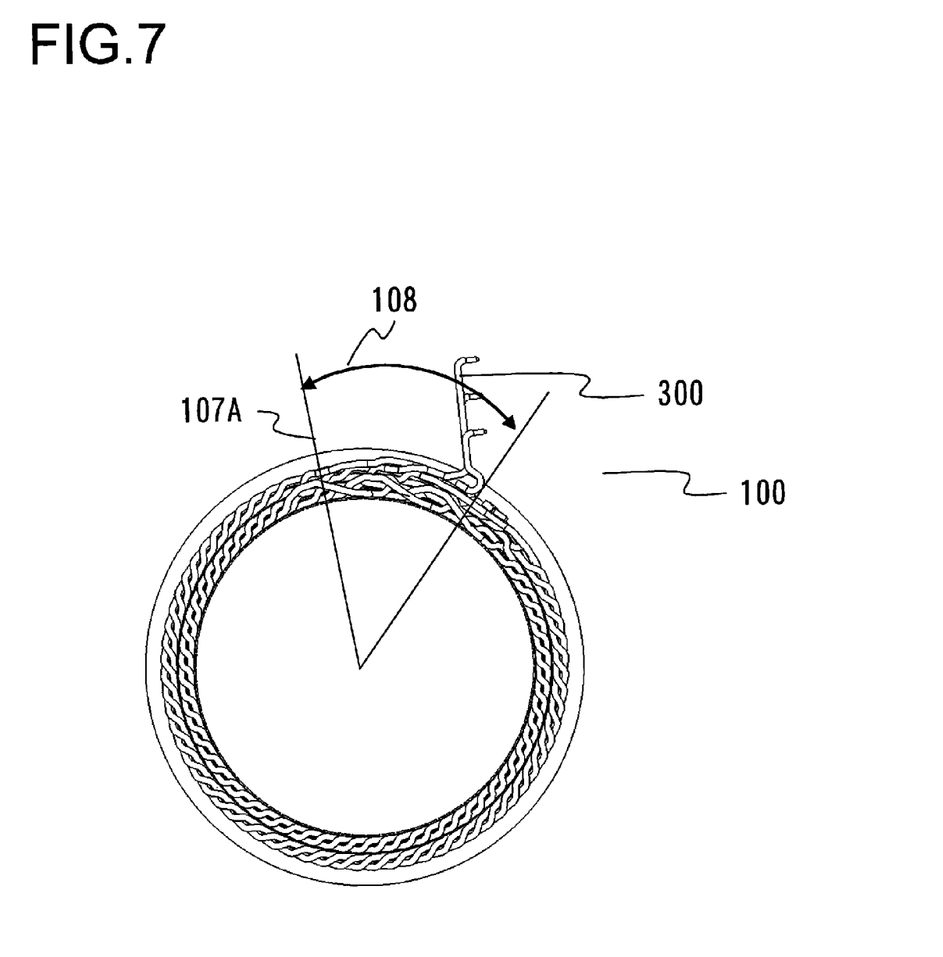

At the leader portions 107 of conductors 106 each located at one end of a stator coil 102, lead wires 300 (301, 302, 303) to be connected with external devices (cables) are disposed. At the leading end of each lead wire 300, a connector terminal 110 is fixed, as shown in FIG. 6. The lead wires 300 in the plurality of stator coils 102 are all led out above the coil end located on one of the two sides of the stator 100 facing opposite each other along the axial direction, and are set so as to congregate in one area with the leading ends thereof oriented in the same direction. In the present embodiment, a V-phase lead wire 301, a W-phase lead wire 302 and a U-phase lead wire 303 are disposed in correspondence to the three stator coils 102, i.e., the V-phase stator coil, the W-phase stator coil and the U-phase stator coil. The lead wires 300 are each formed as an integrated part of the conductor 106 taking up the outermost position along the radial direction among the conductors 106 belonging to the plurality of stator coils 102, which are disposed in a single row extending along the radial direction inside a slot 105. Namely, a lead wire 300 is led out from the conductor 106 disposed at the outermost position along the radial direction in a slot 105. Thus, since the lead wires 300 are led out from the outermost conductors rather than from conductors at the inner position along the radial direction, as in the related art described earlier, shorter lead wires 300 can be laid out at positions further outward along the radial direction relative to the stator core 101, as in the present embodiment, so as to ensure that they do not interfere with another device. As shown in FIG. 5, the lead wires 300 (301, 302 and 303) corresponding to the three phases U, V and W, are read out with predetermined intervals 401 (equivalent to four slots) along the circumferential direction.

In addition, although not shown, the neutral wire portions located at the other ends of the three stator coils 102 are connected through, for instance, a Y-connection or a Δ-connection.

As FIG. 4 shows, four conductors 106a, 106b, 106c and 106d inserted in each slot 105 are disposed in a single row extending along the radius of the stator core 101 so as to form concentric layers. The layers formed with the conductors 106a, 106b, 106c and 106d inserted in the individual slots 105 will be hereafter referred to as a first layer, a second layer, a third layer and a fourth layer starting from the innermost position. In other words, the conductor 106a is inserted to take up a first layer position, the conductor 106b is inserted to take up a second layer position, the conductor 106c is inserted to take up a third layer positioned and the conductor 106d is inserted to take up a fourth layer position.

The conductors 106 constituting the stator coils 102 are flat rectangular coil segments with a rectangular section, as shown in FIGS. 4 through 6, and except for the two ends of each stator coil 106 where the lead wire 300 and the neutral wire portion are provided, the conductors 106 are formed so as to achieve substantially identical shapes. The conductors 106 are each constituted with copper wire that includes two linear portions 112 (see FIG. 5) passing through slots 105 along the axial direction, set apart from one another along the circumferential direction with a predetermined pitch. The copper wire further includes a leader portion 107 led out from the end of a slot 105 located on one of the two sides facing opposite each other along the axial direction (at the upper end in FIG. 3) and forming a U-shape or a V-shape, which connects the two linear portions 112, and welding areas 104 formed at the two ends thereof.

It is to be noted that the conductors may be constituted with coil segments, and in such a case, coil ends at the two ends along the axial direction, located beyond the end of the stator core 101 along the axial direction, can be formed in advance of inserting the coil segments through the slots 104 and thus, optimal insulation distances can be assured with ease for conductors corresponding to different phases or the same phase.

As indicated in FIGS. 3 through 7, the leading ends of the three lead wires 300 (301, 302 and 303), arranged so as to be oriented in the same direction, are set so as to congregate in one area in order to allow the stator 100 in the electric vehicle motor to connect with cables (not shown), i.e., external connectors for connection with external devices, with ease. More specifically, the leading ends of the individual lead wires 300 are positioned so that the sections of the leading ends are oriented to achieve the same attitude, as shown in FIG. 6, to ensure that the surfaces of the three lead wires 300, at which terminals 110 are fixed, all turn to the same side (downward in FIG. 6). In addition, as FIG. 7 indicates, the three lead wires 300 are all positioned further outward relative to the stator core 101 along a straight line extending substantially along the radial direction. Furthermore, since the external connector cables and the lead wires 300 in the vehicle motor need to be disposed as close to each other as possible, the three lead wires 300, constituted with leader portions led out from slots 105 in a lead out area 107A, are disposed so as to congregate within an angular range 108 equal to or less than 60°.

The leader portions 107 of all the conductors 106 each include an inclining wire portion 113 extending along the circumferential direction with an inclination along a predetermined direction relative to the linear portions 112 passing through the slot 105, which is formed at an area led out from an end of the slot 105 located on one of the two sides facing opposite each other along the axial direction. The leader portion 107 of a regular conductor 106 at which a lead wire 300 is not formed takes on a U-shape or a V-shape achieved with another inclining wire portion inclining with an obtuse angle relative to the inclining wire portion 113, and via this leader portion, the two linear portions 112, set apart from each other along the circumferential direction by the predetermined pitch, are connected.

On the other hand, at the leader portion 107 of a conductor at which a lead wire 300 is formed, a turnback portion 400, which turns back by 90° or more relative to the direction in which the inclining wire portion 113 is led out, is formed through bending. In other words, the turnback portion 400 forms a turnback wire portion 402 that turns back from the inclining wire portion 113 along the circumferential direction toward a side substantially opposite from the inclining wire portion 113.

Particularly in the present embodiment, each turnback portion 402 is formed so as to extend parallel to a plane ranging perpendicular to the axis of the stator 100 and along the circumferential direction, as does the coil end group, so as to reduce the salient region where the lead wires 300, projecting out from the coil end group, are disposed.

The lead wires 300 each include a plurality of bent portions such as crank portions 403a, 403b and 403c, which will be described later, in addition to the turnback portion 400 described above. The presence of a plurality of such bent portions makes it possible to improve the durability and reliability even in a structure with the leading ends of the plurality of lead wires 300 disposed so as to congregate in one area, since the improved rigidity achieved with the bent portions inhibits vibration. Furthermore, by setting the bent portions optimally, the lengths of the lead wires 300 can be adjusted. With the lengths of the individual lead wires 300 thus optimized, the resistance values can be equalized among the plurality of lead wires 300.

In an AC motor installed for a vehicle, in particular, variance among the electric resistance values at the U-phase, the V-phase and the W-phase and the resulting variance in the current waveforms and the voltage waveforms are bound to adversely affect various characteristics such as the torque, the induced voltage and the output. In the present embodiment, optimal bent portions are formed at each lead wire 300 so as to adjust the coil length of a particular lead wire 300 and, as a result, the resistance values among the various phase stator coils can be equalized.

Furthermore, although not shown, the lead wires 300 are shielded with an epoxy insulating film constituted of, for instance, an epoxy resin. By shielding the lead wires 300 with such an insulating film, reliable insulation can be assured without compromising the cooling efficiency with which the conductors are cooled.

Figure 8:
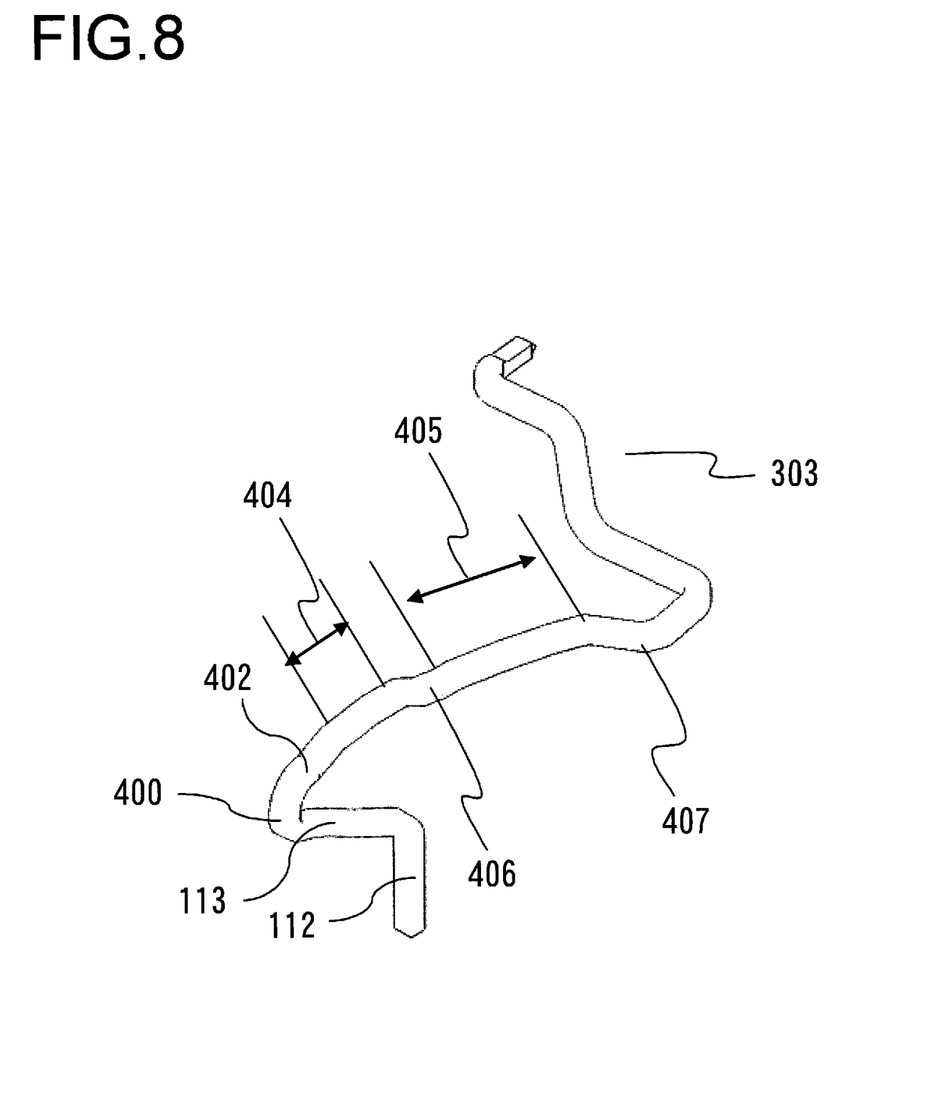

FIG. 8 is a perspective view showing the U-phase lead wire 303 by itself. It is to be noted that since the V-phase lead wire 301 and the W-phase lead wire 304 adopt basic structures similar to that of the U-phase lead wire 303, an explanation of these lead wires will not be provided. The U-phase lead wire 303 includes curved portions 404 and 405 gently curving along the circumference direction of the stator core and bent portions 406 and 407, which are bent markedly. The bent portions 406 and 407 form crank portions bent at least at one point along the axial direction and along the radial direction at least at one point. With the crank portions 406 and 407 formed as described above, optimal lengths for equalizing the electric resistance values can be achieved for the lead wires 300 and furthermore, better durability and reliability are assured through an improvement in the rigidity while keeping the area where the lead wires 300 are formed within a small range. It is to be noted that while the crank portions are formed both along the radial direction and along the axial direction in embodiment 1, the present invention may be adopted in conjunction with lead wires, each having at least one crank portion bent only along either the radial direction or the axial direction.

Figure 9:
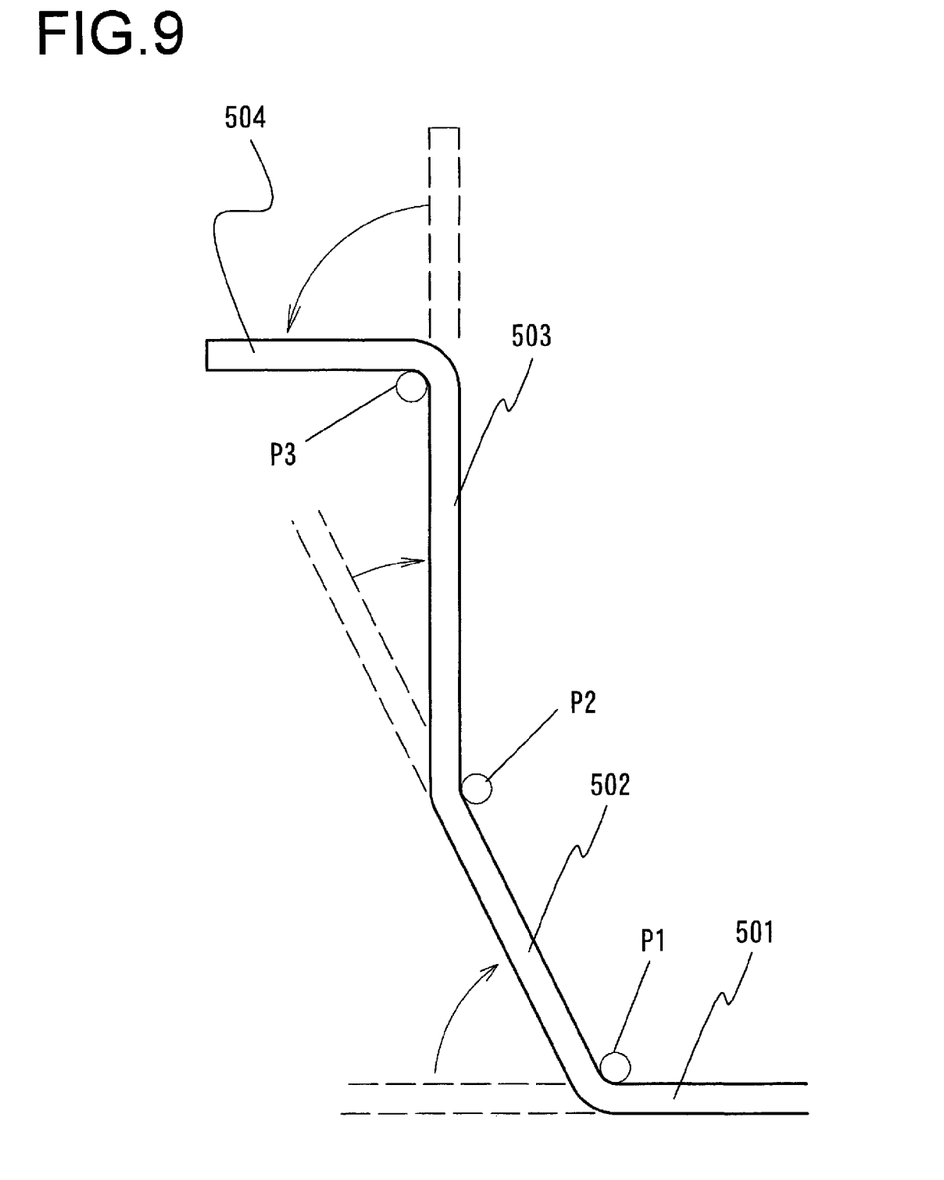
Figure 10A:
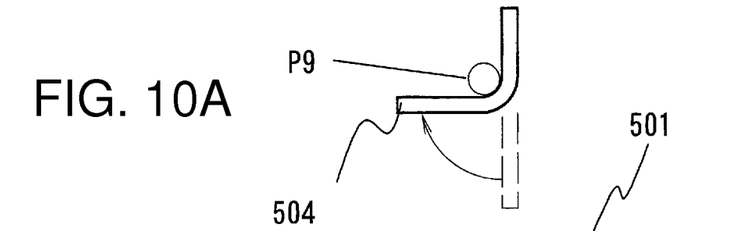
Figure 10B:
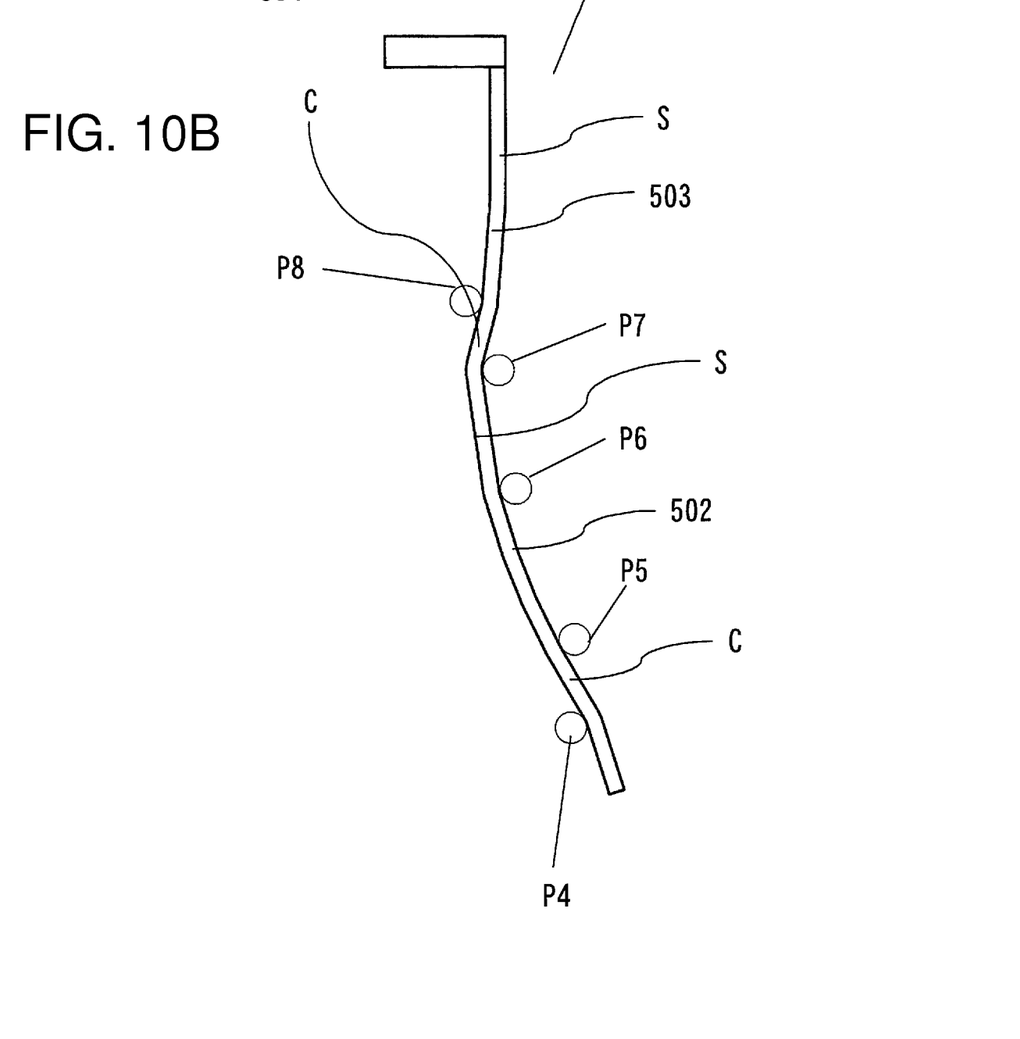

FIG. 9 and FIG. 10 illustrate the coil forming process through which a lead wire 300 is manufactured. FIG. 9 presents a view taken from the center of the stator core 101, whereas FIG. 10 presents a view taken along the axial direction from above a coil end. As FIG. 6 illustrates, the lead wire 303 is formed to achieve a three-dimensional shape, and such a shape must be achieved through a forming process.

The lead wire is bent through the forming process shown in FIG. 9 and FIG. 10 in the order P1 through P10 in the figures. It is to be noted that P1 through P9 also indicate positions of forming pins used in the forming process. At P1 through P3 in FIG. 9, the pins are placed at the surfaces of the rectangular wire with the smaller width for bending. A conductor coil 501 is bent in sequence starting at the pin position P1, followed by the position P2 and then at the pin position P3, thereby forming a first conductor portion 502, a second conductor portion 503 and a terminal portion 504.

At P4 through P9 in FIG. 10, the pins are placed at the surfaces of the rectangular wire with the greater width for bending. As the conductor coil 501 is bent at the pin positions P4 and P5, an ultimate target shape is achieved for the first conductor portion 502. The first conductor portion 502 curves along the direction of the coil end radius. In the next step, the conductor coil 501 is bent at the pin positions P7 and P8 so as to achieve an ultimate target shape for the second conductor portion 503. Finally, the conductor coil 501 is bent by 90° at the pin position P9 and thus, the formation of the terminal portion 504 is completed.

A plurality of crank portions C with which the forming pins are in contact and a linear portion extending between a crank portion C and the next crank portion C, as shown in FIG. 10, can be formed with ease by bending the conductor coil 501 through the forming process as illustrated in FIG. 9 and FIG. 10. The area where a forming pin is placed in contact with the conductor coil 501 to form a crank portion C will become indented by the forming pin. By bending the conductor coil 501 at a plurality of positions, as described above, a lead wire with a complicated curved shape having multiple bent areas can be processed accurately with ease.

Embodiment 2

Figure 11:
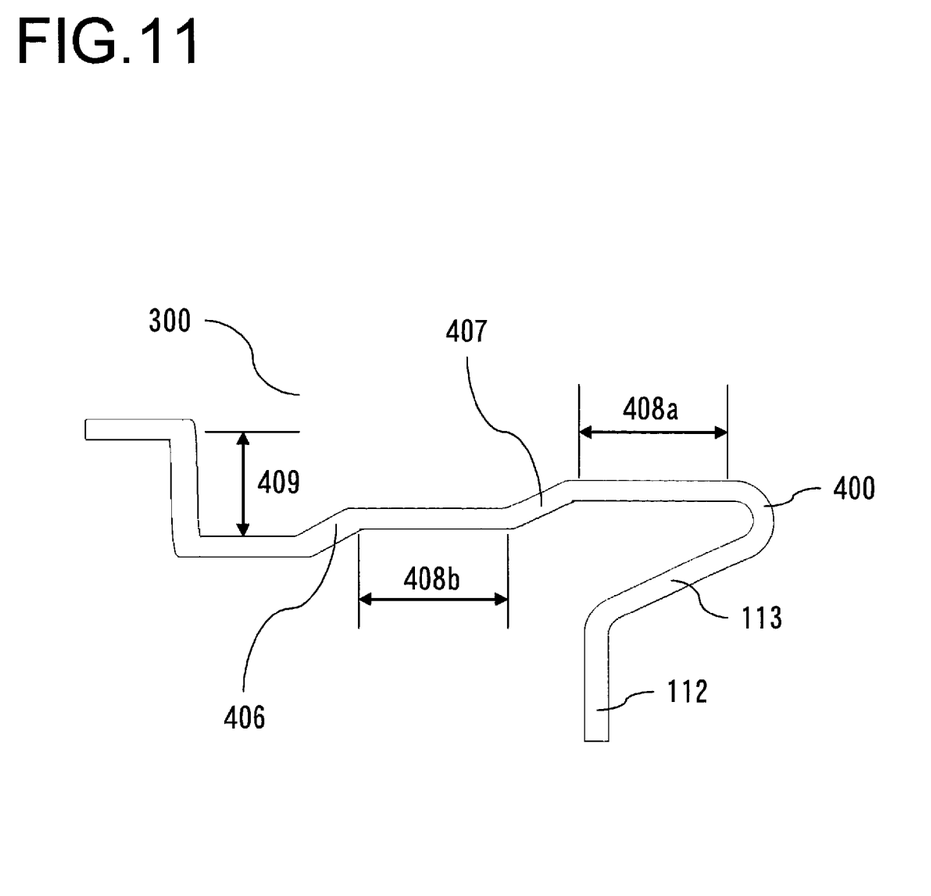

FIG. 11 shows an area near a lead wire of a stator coil achieved in embodiment 2. A lead wire 300 led out from a slot 105 at the stator core through the outermost layer position at the slot 105 along the radial direction includes a turnback portion 400 where it is made to turn back along a direction running at an angle of 90° or more relative to the direction in which the lead wire is initially led out.

In addition, the lead wire 300 in embodiment 2, which includes a turnback wire portion 402 turning back along the direction running with an angle of 90° as described above, further includes two crank portions 406 and 407 bent along the direction of the axis of the stator core, axial direction coil length adjusting portions 408a and 408b, extending along the axial direction, and a radial direction coil length adjusting portion 409 extending along the radial direction, as shown in FIG. 11. By adopting a structure that includes the plurality of axial direction coil length adjusting portions 408a and 408b and the radial direction coil length adjusting portion 409 as described above, it becomes possible to individually adjust the coil lengths in correspondence to the U-phase, the V-phase and the W-phase with ease. As a result, the presence of the bent portions improves the rigidity to inhibit vibration and with the coil lengths adjusted at the various lead wires 300, the entire lengths of the plurality of stator coils can be equalized so as to ultimately equalize the electric resistance values while the leading ends of the lead wires 300 corresponding to the three phases, oriented with a uniform attitude are set to congregate in a single area, as in embodiment 1 described earlier.

While the present invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention. For instance, while the structure described in reference to the embodiments includes three stator coils, the present invention may be adopted in a structure that includes a different number of stator coils. In addition, while the lead wires in the embodiments are exclusively led out from the outermost layer positions assumed along the radial direction in slots, lead wires may instead be led out from the outer layer and the inner layer along the radial direction.

REFERENCE SIGNS LIST

3 . . . rotating electric machine
100 . . . stator
101 . . . stator core
102 . . . stator coil
105 . . . slot
106 . . . conductor
107 . . . leader portion
113 . . . inclining wire portion
200 . . . rotor
300 (301, 302, 303) . . . lead wire
400 . . . turnback portion
402 . . . turnback wire portion
406, 407 . . . bent portion (crank portion)

The invention claimed is:

1. A stator for a rotating electric machine, comprising:
a stator core having a cylindrical shape; and
a plurality of stator coils wound at the stator core, wherein:
a plurality of slots passing through the stator core along an axial direction and set side-by-side along a circumferential direction are formed at the stator core;
the stator coils each extend within the slots along the axial direction and also include leader portions each led out from one of the two ends of the slot along the axial direction and extending along the circumferential direction so as to run astride a plurality of slots, set apart from one another with a predetermined circumferential pitch;
the leader portions each include an inclining wire portion led out from one of the two ends of the slot along the axial direction with an inclination along a predetermined direction relative to the axial direction;
a lead wire which is part of lead wires via which a connection with an external device is achieved is formed at the leader portion to constitute one end of each stator coil, and the lead wires each belonging to one of the plurality of stator coils are all positioned outward relative to the stator core along a same straight line extending substantially along a radial direction and all positioned so as to congregate in one area with leading ends thereof oriented in one direction; and
the lead wires each include a turnback portion bent in the axial direction so as to turn back from the inclining wire portion along the circumferential direction toward a side substantially opposite from the inclining wire portion with an angle equal to or greater than 90° to the direction of the inclining wire portion, wherein the inclining wire portion is the part between the one of the two ends of the slot along the axial direction and the turnback portion.

2. The stator for a rotating electric machine according to claim 1, wherein:
the lead wire is formed as an integrated part of the leader portion of the stator coil taking an outermost position along the radial direction among a plurality of the stator coils disposed in a single row along the radial direction within the slot.

3. The stator for a rotating electric machine according to claim 1, wherein:
the lead wire includes a turnback wire portion formed to turn back from the inclining wire portion at the turnback portion and extend in a circumferential direction toward a side opposite from the inclining wire portion.

4. The stator for a rotating electric machine according to claim 1, wherein:
a crank portion for vibration absorption, bent in in a crank shape, is formed at the lead wire.

5. The stator for a rotating electric machine according to claim 1, wherein:
in addition to the turnback portion, a bent portion bent along the axial direction or the radial direction is formed at the lead wire.

6. The stator for a rotating electric machine according to claim 1, wherein:
the lead wires at the plurality of stator coils are all disposed within an angular range of 60° or less viewed along the axial direction.

7. The stator for a rotating electric machine according to claim 1, wherein:
the stator coils each include two linear portions to be inserted through two slots set apart from each other with a predetermined circumferential pitch, a leader portion led out from an end of the slot located on one of two sides facing opposite each other along the axial direction to connect the two linear portions, and welding portions led out from ends of the slots located on another side along the axial direction to be electrically connected to another conductor, disposed next thereto, through welding; and
the lead wires are each formed at the leader portion of a conductor constituting an end of one of the stator coils.

8. The rotor for a rotating electric machine according to claim 1, wherein:
lengths of the lead wires are set so as to equalize resistance values at the plurality of stator coils.

9. The stator for a rotating electric machine according to claim 1, wherein:
the plurality of stator coils are connected on a side opposite from ends thereof where the lead wires are formed.

* * * * *